US012619025B2

(12) United States Patent
Westerhoff et al.

(10) Patent No.: US 12,619,025 B2
(45) Date of Patent: May 5, 2026

(54) SIDE-EMITTING OPTICAL FIBERS WITH SURFACE MODIFICATION

(71) Applicant: Arizona Board of Regents on behalf of Arizona State University, Scottsdale, AZ (US)

(72) Inventors: Paul K. Westerhoff, Scottsdale, AZ (US); Zhe Zhao, Tempe, AZ (US); Nora Shapiro, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 19/073,285

(22) Filed: Mar. 7, 2025

(65) Prior Publication Data

US 2025/0244524 A1      Jul. 31, 2025

Related U.S. Application Data

(63) Continuation of application No. PCT/US2023/079309, filed on Nov. 10, 2023.
(Continued)

(51) Int. Cl.
*G02B 6/02* (2006.01)
*C03C 25/105* (2018.01)

(52) U.S. Cl.
CPC ........ *G02B 6/02395* (2013.01); *C03C 25/105* (2013.01); *C03C 2218/328* (2013.01)

(58) Field of Classification Search
CPC ..................... G02B 6/02395; C03C 2218/328
See application file for complete search history.

(56) References Cited

U.S. PATENT DOCUMENTS 4,066,546 A * 1/1978 Sasaki .................... B01D 65/08
                                                          210/791
4,234,907 A     11/1980 Daniel
                    (Continued)

FOREIGN PATENT DOCUMENTS

| CN | 1612754 A * | 5/2005 | ............. A61L 9/205 |
| ES | 2673673 A1 | 6/2018 | |
| | (Continued) | | |

OTHER PUBLICATIONS

CN-1612754-A—English Language Text (Year: 2005).*
(Continued)

*Primary Examiner* — Peter Radkowski
(74) *Attorney, Agent, or Firm* — Fish & Richardson P.C.

(57)      ABSTRACT

A modified side-emitting optical fiber includes a core comprising an optical fiber and a UV-C transparent polymer coating over the core. An average surface roughness of the UV-C transparent polymer coating is in a range of about 0.3 $\mu$m to about 0.7 $\mu$m as measured by root mean square of distance difference measurements of the surface of the UV-C transparent polymer coating. Fabricating a modified side-emitting optical fiber includes contacting a coated optical fiber with a solvent, wherein the coated optical fiber comprises a UV-C transparent polymer coating, and dissolving at least a portion of the UV-C transparent polymer coating in the solvent to yield the modified side-emitting optical fiber, wherein an average surface roughness of the UV-C transparent polymer coating is in a range of about 0.3 $\mu$m to about 0.7 $\mu$m.

20 Claims, 7 Drawing Sheets

Side-emitted light

100

Smooth Polymer layer

104

Rough Polymer layer $\theta < \theta_c$ $\theta_c$ $\theta_c$ $\theta < \theta_c$ LED light

102

Optical fiber

Related U.S. Application Data

(60) Provisional application No. 63/424,195, filed on Nov. 10, 2022.

(56) References Cited

U.S. PATENT DOCUMENTS

| | | | |
|---|---|---|---|
| 4,466,697 A | 8/1984 | Daniel | |
| 4,519,017 A | 5/1985 | Daniel | |
| 4,715,700 A | 12/1987 | Daniel | |
| 4,911,543 A | 3/1990 | Hodgson | |
| 4,965,701 A | 10/1990 | Voland | |
| 5,021,928 A | 6/1991 | Daniel | |
| 5,183,323 A | 2/1993 | Daniel | |
| 5,187,765 A * | 2/1993 | Muehlemann | G02B 6/04 |
| | | | 385/115 |
| 5,637,877 A * | 6/1997 | Sinofsky | A61N 5/0601 |
| | | | 606/15 |
| 5,905,837 A * | 5/1999 | Wang | G02B 6/2817 |
| | | | 385/127 |
| 6,104,371 A | 8/2000 | Wang et al. | |
| 6,154,595 A | 11/2000 | Yokogawa et al. | |
| 6,418,252 B1 * | 7/2002 | Maitland | G02B 6/0008 |
| | | | 385/31 |
| 6,596,016 B1 | 7/2003 | Vreman et al. | |
| 6,601,247 B2 * | 8/2003 | Shimizu | G02B 6/001 |
| | | | 4/584 |
| 6,602,544 B2 | 8/2003 | Piselli | |
| 6,742,916 B1 * | 6/2004 | Dunn | B60Q 1/32 |
| | | | 362/540 |
| 6,821,007 B1 * | 11/2004 | Olman | B60Q 1/50 |
| | | | 362/581 |
| 6,851,844 B2 | 2/2005 | Guy | |
| 6,991,847 B2 | 1/2006 | Padmanabhan et al. | |
| 7,022,238 B2 * | 4/2006 | Eguchi | B01D 61/18 |
| | | | 210/636 |
| 7,234,853 B2 | 6/2007 | Givoletti | |
| 7,274,844 B2 | 9/2007 | Walt et al. | |
| 7,386,203 B2 * | 6/2008 | Maitland | G02B 6/262 |
| | | | 385/27 |
| 7,566,157 B2 * | 7/2009 | Lo | F21V 33/008 |
| | | | 362/555 |
| 7,708,974 B2 | 5/2010 | Yadav | |
| 7,765,835 B2 | 8/2010 | Karayianni et al. | |
| 7,834,528 B2 | 11/2010 | Numajiri et al. | |
| 8,331,750 B2 * | 12/2012 | Deng | B29D 11/00663 |
| | | | 385/123 |
| 8,492,448 B2 * | 7/2013 | Dewa | C03C 25/105 |
| | | | 520/1 |
| 8,929,703 B2 * | 1/2015 | Logunov | B05D 5/063 |
| | | | 385/123 |
| 9,259,513 B2 * | 2/2016 | Bedwell | A61M 25/0045 |
| 9,618,672 B2 * | 4/2017 | Kuchinisky | G02B 6/001 |
| 10,092,356 B2 * | 10/2018 | Griffin | G02B 6/0003 |
| 10,175,405 B2 * | 1/2019 | Logunov | G02B 6/102 |
| 10,293,065 B2 * | 5/2019 | Victor | A61L 2/10 |
| 10,323,183 B2 | 6/2019 | Bish et al. | |
| 10,471,277 B2 * | 11/2019 | Rhodes | A61M 25/0009 |
| 10,537,858 B2 * | 1/2020 | Darling | C02F 1/442 |
| 10,620,356 B1 * | 4/2020 | Beauchamp | F21S 41/29 |
| 10,663,133 B2 * | 5/2020 | Beauchamp | G02B 6/001 |
| 10,765,768 B2 * | 9/2020 | Victor | A61M 16/04 |
| 10,788,621 B2 * | 9/2020 | Li | C03C 25/1065 |
| 10,870,798 B2 | 12/2020 | Li et al. | |
| 10,933,253 B1 | 3/2021 | Bish et al. | |
| 10,934,179 B2 * | 3/2021 | Bauer | A61L 2/18 |
| 10,954,151 B1 | 3/2021 | McDonald | |
| 11,390,548 B2 * | 7/2022 | Moreau | C02F 1/008 |
| 2002/0094161 A1 * | 7/2002 | Maitland | G02B 6/0008 |
| | | | 385/901 |
| 2002/0138120 A1 | 9/2002 | Whitehurst | |
| 2003/0019028 A1 * | 1/2003 | Shimizu | G02B 6/001 |
| | | | 4/541.5 |
| 2003/0026574 A1 | 2/2003 | Suzuki et al. | |
| 2003/0045195 A1 | 3/2003 | Piselli | |
| 2003/0148088 A1 * | 8/2003 | Padmanabhan | B82Y 20/00 |
| | | | 428/304.4 |
| 2003/0156426 A1 | 8/2003 | Givoletti | |
| 2003/0178369 A1 * | 9/2003 | Eguchi | B01D 65/08 |
| | | | 210/321.79 |
| 2004/0012979 A1 | 1/2004 | Squicciarini | |
| 2004/0037091 A1 | 2/2004 | Guy | |
| 2005/0074216 A1 * | 4/2005 | Irie | G02B 6/02033 |
| | | | 385/127 |
| 2005/0223464 A1 | 10/2005 | Huang et al. | |
| 2005/0271566 A1 | 12/2005 | Yadav | |
| 2006/0087832 A1 | 4/2006 | Peng et al. | |
| 2006/0109676 A1 * | 5/2006 | Man Lo | G09F 13/22 |
| | | | 362/555 |
| 2006/0257095 A1 | 11/2006 | Walt et al. | |
| 2007/0062857 A1 | 3/2007 | Popa et al. | |
| 2007/0267966 A1 | 11/2007 | Numajiri et al. | |
| 2008/0019657 A1 * | 1/2008 | Maitland | G02B 6/262 |
| | | | 385/38 |
| 2009/0071196 A1 | 3/2009 | Karayianni et al. | |
| 2009/0082759 A1 | 3/2009 | Pryor et al. | |
| 2010/0029157 A1 | 2/2010 | Brochier | |
| 2010/0210450 A1 | 8/2010 | Yadav | |
| 2010/0233021 A1 * | 9/2010 | Sliwa | A61M 25/0017 |
| | | | 422/20 |
| 2011/0188261 A1 * | 8/2011 | Deng | G02B 6/0003 |
| | | | 264/1.24 |
| 2011/0269358 A1 | 11/2011 | Peng et al. | |
| 2012/0228236 A1 * | 9/2012 | Hawkins | B01J 19/123 |
| | | | 422/186 |
| 2013/0060188 A1 * | 3/2013 | Bedwell | A61L 29/106 |
| | | | 604/21 |
| 2013/0090402 A1 * | 4/2013 | Dewa | C03C 25/105 |
| | | | 385/115 |
| 2013/0156392 A1 * | 6/2013 | Logunov | G02B 6/02 |
| | | | 65/430 |
| 2014/0001036 A1 * | 1/2014 | Nakanishi | B01J 35/70 |
| | | | 204/290.01 |
| 2014/0063838 A1 | 3/2014 | Kouzmina et al. | |
| 2014/0355295 A1 * | 12/2014 | Kuchinisky | G02B 6/001 |
| | | | 362/558 |
| 2015/0144802 A1 * | 5/2015 | Bauco | A61L 2/10 |
| | | | 250/435 |
| 2015/0369986 A1 * | 12/2015 | Logunov | G02B 6/032 |
| | | | 362/558 |
| 2016/0038621 A1 * | 2/2016 | Victor | A61M 25/0017 |
| | | | 128/202.16 |
| 2017/0010411 A1 * | 1/2017 | Li | C03C 25/1065 |
| 2017/0135765 A1 * | 5/2017 | Griffin | G02B 6/0003 |
| 2017/0203258 A1 * | 7/2017 | Darling | C02F 1/44 |
| 2018/0134583 A1 * | 5/2018 | Bauer | C02F 9/00 |
| 2018/0244992 A1 | 8/2018 | Han et al. | |
| 2018/0321440 A1 | 11/2018 | Bilodeau et al. | |
| 2018/0356588 A1 * | 12/2018 | Lopath | G02B 6/02033 |
| 2019/0078754 A1 * | 3/2019 | Beauchamp | F21S 43/37 |
| 2019/0175937 A1 * | 6/2019 | Rhodes | A61M 25/0017 |
| 2019/0192879 A1 * | 6/2019 | Zaborsky | A61L 2/24 |
| 2019/0262486 A1 * | 8/2019 | Victor | A61M 25/0102 |
| 2019/0292452 A1 | 9/2019 | Han et al. | |
| 2020/0110210 A1 * | 4/2020 | Beauchamp | F21S 43/27 |
| 2020/0158948 A1 | 5/2020 | Westerhoff et al. | |
| 2021/0046521 A1 | 2/2021 | Jongerius | |
| 2021/0078886 A1 * | 3/2021 | Moreau | C02F 1/008 |
| 2021/0079297 A1 | 3/2021 | Han et al. | |
| 2021/0122667 A1 | 4/2021 | Westerhoff et al. | |
| 2021/0135423 A1 | 5/2021 | Macomber | |
| 2022/0091325 A1 | 3/2022 | Akari et al. | |
| 2022/0102937 A1 | 3/2022 | Chan et al. | |
| 2022/0171122 A1 | 6/2022 | Chen et al. | |
| 2022/0249719 A1 | 8/2022 | Westerhoff et al. | |
| 2024/0126008 A1 | 4/2024 | Westerhoff et al. | |
| 2024/0316526 A1 | 9/2024 | Lai et al. | |

FOREIGN PATENT DOCUMENTS

| | | | |
|---|---|---|---|
| ES | 2673673 B1 * | 1/2019 | C02F 1/32 |
| JP | 2007130029 A * | 5/2007 | |

(56) References Cited

FOREIGN PATENT DOCUMENTS

| KR | 100909102 B1 | * | 3/2008 | | |
| WO | WO-02057686 A1 | * | 7/2002 | .......... | G02B 6/0008 |
| WO | WO-2014159874 A1 | * | 10/2014 | .............. | A61L 2/00 |
| WO | WO-2016197397 A1 | * | 12/2016 | .............. | B01J 20/26 |

OTHER PUBLICATIONS

ES-2673673-B1—English Language Text (Year: 2019).*

JP-2007130029-A—English Language Text (Year: 2007).*

KR-100909102-B1—English Language Text (Year: 2009).*

WO-2016197397-A1—English Language Text (Year: 2016).*

Yang et al., A new method to prepare high performance perfluorinated sulfonic acid ionomer/porous expanded polytetrafluoroethylene composite membranes based on perfluorinated sulfonyl fluoride polymer solution, Journal of Power Sources 243 (2013) 392e395 (Year: 2013).*

Lanzarini-Lopes et al., Nanoparticle and Transparent Polymer Coatings Enable UV-C Side-Emission Optical Fibers for Inactivation of *Escherichia coli* in Water, Environ. Sci. Technol. 2019, 53, 10880-10887 (Year: 2019).*

Lanzarini-Lopes et al., Germicidal glowsticks: Side-emitting optical fibers inhibit *Pseudomonas aeruginosa* and *Escherichia coli* on surfaces, Water Research 184 (2020) 116191 (Year: 2020).*

Zhao et al., Evanescent wave interactions with nanoparticles on optical fiber modulate side emission of germicidal ultraviolet light, Environ. Sci.: Nano, 2021,8, 2441-2452 (Aug. 16, 2021) (Year: 2021).*

Zhong et al., "Effects of surface roughness on optical properties and sensitivity of fiber-optic evanescent wave sensors," Appl. Opt. 52, 3937-3945 (2013) (Year: 2013).*

Bayrakpeken et al., "Resonance Fluorescence of Fused Silica by the Depopulation of the Ground State." International Journal of Photoenergy 2012 (2012): 1-3. (Year: 2012).

Bouchet et al., Enhancement and Inhibition of Spontaneous Photon Emission by Resonant Silicon Nanoantennas, Phys. Rev. Applied 6, 064016—Published Dec. 28, 2016 (Year: 2016).

Dai et al., Ultraviolet C irradiation: an alternative antimicrobial approach to localized infections? Expert Rev Anti Infect Ther. Feb.

2012; 10(2): 185-95. doi: 10.1586/eri.11.166. PMID: 22339192; PMCID: PMC3292282. (Year: 2012).

Glinka et al., Photoluminescence Spectroscopy of Silica-Based Mesoporous Materials, J. Phys. Chem. B 2000, 104, 36, 8652-8663 (Year: 2000).

International Search Report and Written Opinion in International Appln. No. PCT/US2023/79309, mailed on Mar. 22, 2024, 14 pages.

Lanzarini-Lopes et al., "Ultra-Violet Emitting Optical Fibers for Water Treatment," 2017 Lawrence Livermore National Laboratory Summer Student Poster Symposium, Livermore, CA, Aug. 2017. LLNL-POST-735252, 1 page (Year: 2017).

Pei et al., Tuning surface properties of amino-functionalized silica for metal nanoparticle loading: The vital role of an annealing process, Surface Science, V. 648, Jun. 2016, pp. 299-306. (Year: 2016).

Polshettiwar et al., (2010), High-Surface-Area Silica Nanospheres (KCC-1) with a Fibrous Morphology. Angew. Chem. Int. Ed., 49:9652-9656. https://doi.org/10.1002/anie.201003451 (Year: 2010).

Ryu et al., Hierarchical mesoporous silica nanoparticles as superb light scattering materials, Chem. Commun., 2016,52, 2165-2168 (Year: 2016).

Suteewong et al., Highly Aminated Mesoporous Silica Nanoparticles with Cubic Pore Structure, J. Am. Chem. Soc. 2011, 133, 2, 172-175, https://doi.org/10.1021/ja1061664 (Year: 2011).

Tomonori Matsushita, Yuki Nakamura, and Takashi Kondo, "Design of zigzag folded inversion-stacked AIGaAs waveguides for ultra-compact wavelength converters," Opt. Express 25, 22829-22839 (2017) (Year: 2017).

V. A. Sterligov, "Scattering and reflection of light by ordered mesoporous silica films," in Frontiers in Optics, OSA Technical Digest Series (Optica Publishing Group, 2005), paper FThT5. (Year: 2005).

Extended European Search Report in European Appln. No. 23889745. 8, mailed on Jan. 27, 2026, 9 pages.

Im et al., "Modification of Plastic Optical Fiber for Side-Illumination," International Conference on Human-Computer Interaction, Beijing, China, Jul. 22-27, 2007, 4551:1123-1129.

Leosson et al., "Integrated Biophotonics with CYTOP," Micromachanics, Feb. 2012, 3:114-125.

* cited by examiner

SIDE-EMITTING OPTICAL FIBERS WITH SURFACE MODIFICATION

CROSS-REFERENCE TO RELATED APPLICATIONS

This application is a continuation of International Application No. PCT/US2023/079309, filed on Nov. 10, 2023, which claims the benefit of U.S. Patent Application No. 63/424,195 filed on Nov. 10, 2022, both of which are incorporated by reference herein in their entirety.

STATEMENT OF GOVERNMENT SUPPORT

This invention was made with government support under 1449500 awarded by National Science Foundation and under 80NSSC21C0034 awarded by the National Aeronautical & Space Administration. The government has certain rights in the invention.

TECHNICAL FIELD

This invention relates to side-emitting optical fibers with modified surfaces for use in germicidal UV-C disinfection.

BACKGROUND

Germicidal ultraviolet-C (UV-C) disinfection is a widely used technology that is commonly accomplished using mercury lamps, which have several disadvantages. Light emitting diodes (LEDs) are mercury-free, and advances over the past decade have improved their efficiencies in the UV-C ranges. The current limitation of LEDs is their relatively small and limited area of irradiation per chip, which limit the area or zone in which LEDs can disinfect microorganisms in water or surface biofilms.

SUMMARY

A low-cost and tunable manufacturing method is described to enable side-emission of germicidal light from flexible glass optical fibers with a core diameter in range of about 125 µm to about 1500 µm with an ultraviolet-C (UV-C) transparent polymer coating into air or water along the length of the fiber. Optical fibers that emit light along the length of the fiber are made by partially dissolving away a UV-C transparent polymer coating covering the optical fiber core. The partial dissolution of the polymer coating creates a textured or roughened surface which facilitates side-emission of light out of the core of the optical fiber. The optical fiber design facilitates the use of UV-LED based light for disinfection, oxidation, or other purposes. The size and flexibility of the side-emitting optical fiber (SEOF) allows germicidal UV-C irradiation in difficult to reach areas where microbial proliferation often occurs.

Although the disclosed inventive concepts include those defined in the attached claims, it should be understood that the inventive concepts can also be defined in accordance with the following embodiments.

Embodiment 1 is a modified side-emitting optical fiber comprising:

a core comprising an optical fiber; and a UV-C transparent polymer coating over the core, wherein an average surface roughness of the UV-C transparent polymer coating is in a range of about 0.3 µm to about 0.7 µm as measured by root mean square of distance difference measurements of the surface of the UV-C transparent polymer coating.

Embodiment 2 is the modified side-emitting optical fiber of embodiment 1, wherein the optical fiber comprises glass or quartz.

Embodiment 3 is the modified side-emitting optical fiber of embodiment 1 or 2, wherein the core has a diameter in a range of about 125 µm to about 1500 µm.

Embodiment 4 is the modified side-emitting optical fiber of any one of embodiments 1-3, wherein the optical fiber has a refractive index in a range of about 1.4 to about 1.6.

Embodiment 5 is the modified side-emitting optical fiber of any one of embodiments 1-4, wherein the optical fiber has a numerical aperture in a range of about 0.1 to about 0.5.

Embodiment 6 is the modified side-emitting optical fiber of any one of embodiments 1-5, wherein the thickness of the UV-C transparent polymer coating before modification is in a range of about 5 µm to about 50 µm.

Embodiment 7 is the modified side-emitting optical fiber of any one of embodiments 1-6 wherein the UV-C transparent polymer coating comprises a fluorinated polymer.

Embodiment 8 is the modified side-emitting optical fiber of any one of embodiments 1-7, wherein the UV-C transparent polymer coating comprises nanoparticles with a diameter in a range of about 100 nm to about 500 nm.

Embodiment 9 is the modified side-emitting optical fiber of embodiment 8, wherein the nanoparticles comprise silicon, silica oxide, gold, silver, other metals, or other metal oxides.

Embodiment 10 is the modified side-emitting optical fiber of embodiment 9, wherein the nanoparticles are functionalized with aminated organic compounds, carboxylated organic compounds, or neutral organic ligands.

Embodiment 11 is a method of fabricating a modified side-emitting optical fiber, the method comprising:

contacting a coated optical fiber with a solvent, wherein the coated optical fiber comprises a UV-C transparent polymer coating; and dissolving at least a portion of the UV-C transparent polymer coating in the solvent to yield the modified side-emitting optical fiber, wherein an average surface roughness of the UV-C transparent polymer coating is in a range of about 0.3 µm to about 0.7 µm.

Embodiment 12 is the method of embodiment 11, wherein the average surface roughness corresponds to a root mean square of distance difference measurements of the surface of the UV-C transparent polymer coating.

Embodiment 13 is the method of embodiments 11 or 12, wherein the solvent comprises an organic solvent.

Embodiment 14 is the method of embodiment 13, wherein the organic solvent comprises a fluorinated organic solvent.

Embodiment 15 is the method of embodiment 14, wherein the fluorinated organic solvent comprises perfluorotributylamine.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

This disclosure relates to ultraviolet-C (UV-C) side emitting optical fibers (SEOFs) for use in controlling biofilms and inactivating microorganisms in water or air. The external surface of UV-C transparent polymer coating on optical glass fibers can be chemically and/or mechanically modified (e.g., etched, textured, or roughened) to induce light scattering along the length of the fiber. The manufacturing process to make modified side-emitting optical fibers can be tuned to induce different levels of side-emission of UV-C light. In some cases, this surface modification can be achieved during manufacturing. In other cases, this surface modification is achieved through partial removal of a uniformly coated polymer on an optical fiber.

Light transmission and reflection between two different media (e.g., the optical fiber and the outer polymer layer) is affected by the reflective index (RI) of the environment and the incident angle at the interface. The UV-C transparent polymer CYTOP® used on the fiber has a refractive index (RI) of 1.34, which corresponds to a critical angle ($\theta_c$) of 48° for total internal reflection (TIR) according to Snell's law. Therefore, all light rays within the CYTOP® layer from the optical fiber can be side emitted when the incident angle ($\theta$) is between 0° (perpendicular to the surface) and 48°. Only a fraction of light can be side emitted when the polymer layer is uniform.

Figure 1:
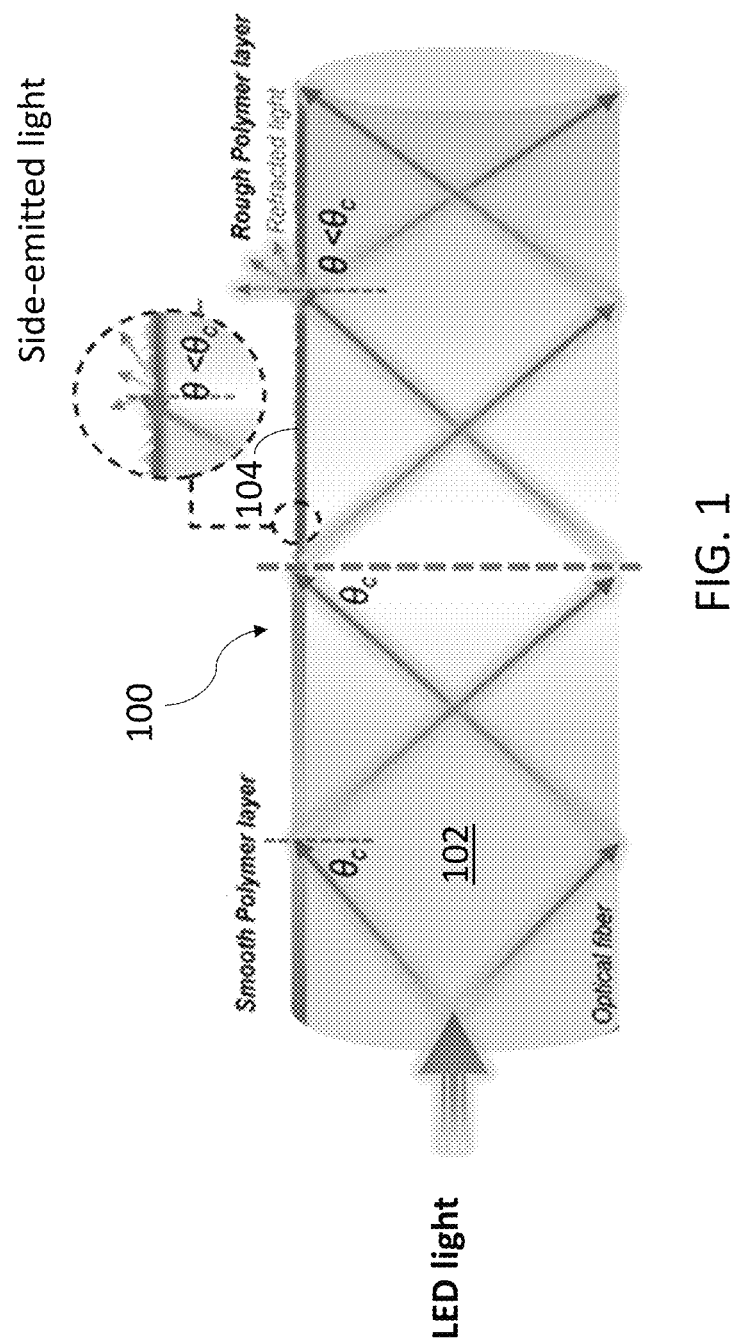
FIG. 1 depicts a portion of a side emitting optical fiber (SEOF) optically coupled to a light emitting diode (LED).

Modifying the surface of the outer polymer layer changes the refraction angles of light in the polymer coating, and leads to side-emission of UV-C light along the length of the fiber. A light ray that would nominally undergo total internal reflection (TIR) may interact with a part of the boundary altered by surface roughness and have $\theta < \theta_c$, thus causing transmittance out of the fiber, and a change in direction in the reflected ray that can lead to further transmittance through the boundary. FIG. 1 depicts a portion of side-emitting optical fiber 100 with core 102 and UV-C transparent polymer coating 104 over the core. The extent of surface modification of the polymer is a tunable parameter that can be varied to adjust the amount of UV-C light side-emitted from the fiber.

As described herein, an optical fiber core (e.g., glass or quartz) is typically coated with a flexible UV-C transparent polymer. Suitable examples of these polymer materials include fluorinated polymers (e.g., CYTOP®). A core diameter of the optical fiber is typically in a range of about 125 μm to about 1500 μm, a refractive index of the optical fiber is typically in a range of about 1.4 to about 1.6, and its numerical aperture is typically in a range of about 0.1 to about 0.5. In some examples, the thickness of the polymer coating before modification is in a range of about 5 μm to about 50 μm. The polymer protects the side-emitting optical fiber from physical damage and enables its bendability (i.e., maintains strength).

Figure 2:
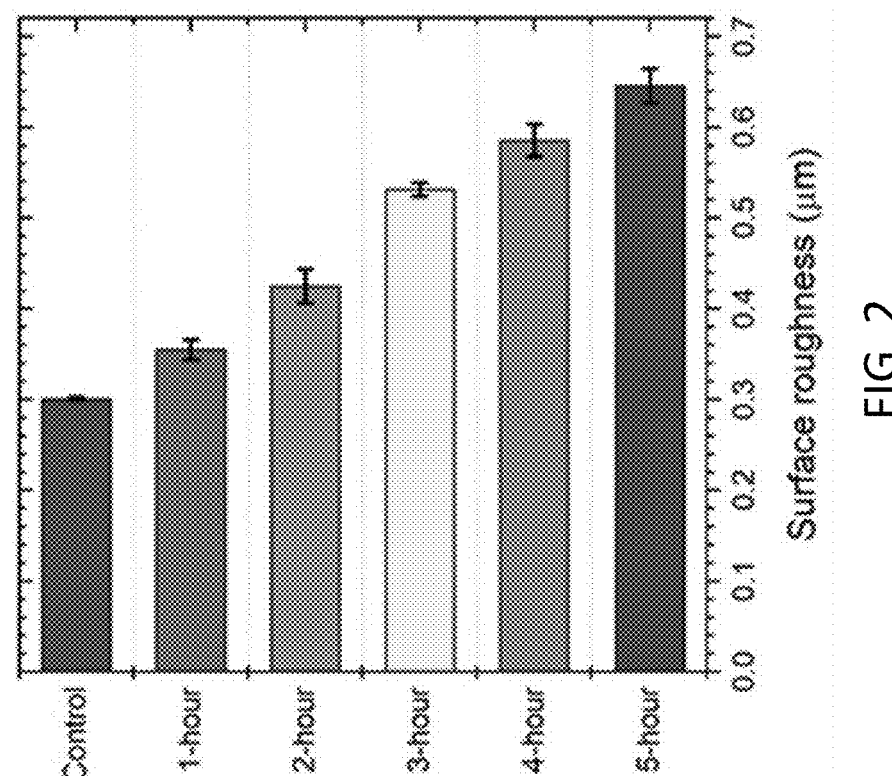
FIG. 2 shows surface roughness of a glass optical fiber coated with a UV-C transparent polymer with varying duration of treatment time with perfluorotributylamine.

The polymer coated optical fiber can be contacted with a solvent to partially dissolve the polymer coating to create a modified (e.g., roughened) surface layer. In some examples, suitable solvents to partially dissolve the polymer include organic solvents (e.g., perfluorotributylamine, perfluoro-N-isopropylmorpholine, perfluoro 1,2-dimethyl cyclohexane, or perfluorodecalin). In some examples, perfluorotributylamine is used to partially dissolve the polymer. The contact time for the polymer coated optical fiber and the solvent is typically up to about 5 hours. FIG. 2 shows the surface roughness of a 500 μm optical fiber with varying duration of treatment time with perfluorotributylamine. Solvent contact times can differ at different positions along the optical fiber to yield an optical fiber with varied roughness along its length.

A surface modified UV-C side emitting optical fiber can be made to include nanoparticles in the polymer coating to facilitate light scattering along the length of the fiber. Suitable nanoparticle materials include silicon, silica oxide, gold, silver or other metals or metal oxides. These materials can be functionalized with aminated organic compounds to create cationic surface charge, carboxylated organic compounds to create anionic surface charge, or neutral organic compounds. The nanoparticles can have a diameter in a range of about 100 nm to about 500 nm.

Mechanical tests confirm the capability of roughened optical fiber to maintain desired flexibility and mechanical strength of the roughened UV-C polymer coated optical fiber. Surface roughness was calculated using spatial sub-nanometer scale resolution pixilated data collected by an optical profilometer by taking the root mean square of distance difference measurements for hundreds of datapoints collected at multiple locations on the fiber surface of the modified UV-C transparent polymer coating and control (unmodified polymer coated fiber). In some examples, the side emitting optical fiber has an average surface roughness in a range of about 0.3 μm to about 0.7 μm after contacting the solvent. Companion data collected by scanning electron microscopy (SEM) confirmed the optical profilometer data that the surface modifications altered the surface roughness. Solvent contact times can differ at different positions along the optical fiber to yield an optical fiber with varied roughness along its length.

A "subtractive engineering" approach is disclosed herein in which surface roughness on the outer CYTOP® polymer layer of the SEOF is created through partial removal of the outer CYTOP® polymer coating. This was accomplished by exposing SEOF to a solvent that dissolves the CYTOP® polymer (see Experiment 1), which creates surface roughness. The extent of surface roughness was controlled by exposing the SEOF to the solvent (e.g., perfluorotributylamine) for various treatment times. A longer treatment time inside the solvent leads to more "patchiness" or "roughness" on the outer polymer layer, with a surface roughness value increase from 0.3 μm to over 0.6 μm. The resulting surface changes were monitored using SEM and optical profilometer measurements and quantified as a surface roughness parameter (SR, see Example 5).

The original coating had a very low SR value of 0.3±0.02 μm, which is consistent with on-line optical measurements made in the draw tower. Treating the SEOF with different durations in the solvent created rougher surface with increased SR values of up to 0.65±0.03 μm (FIG. 2).

Figure 3:
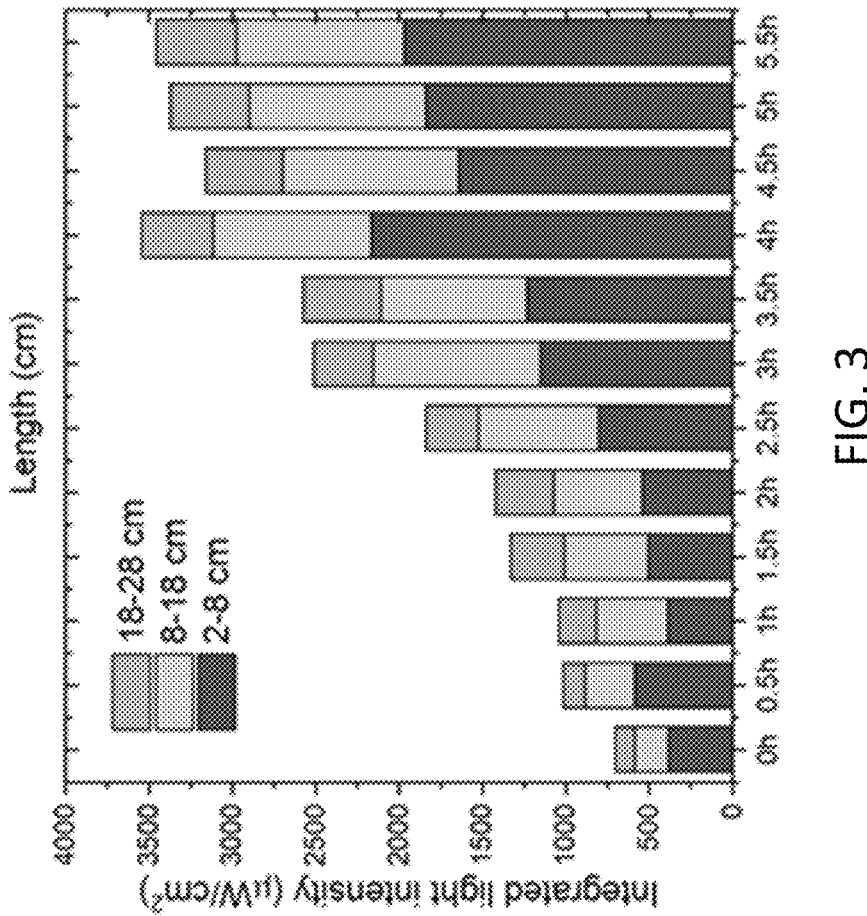
FIG. 3 shows integrated light intensity along a glass optical fiber with varying duration of perfluorotributylamine treatment.

The control SEOF side emitted 124±6 $\mu$W/cm$^2$ at the proximal end and decreased exponentially to 8±2 $\mu$W/cm$^2$ at the terminal end. For as-received unmodified (control) fiber (SR=0.3±0.02 $\mu$m) to fibers exposed to the solvent for the longest duration (SR~0.6 $\mu$m), the light irradiance increased from 147±6 $\mu$W/cm$^2$ to 610±120 $\mu$W/cm$^2$ at the proximal end, and 11±0.8 $\mu$W/cm$^2$ to 57±11 $\mu$W/cm$^2$ at terminal end, respectively. Thus, surface roughness had a positive impact on UV-C light side emitted from the SEOF. Side emission reached a plateau when SR exceeded 0.5 $\mu$m, with further increases in roughness not significantly enhancing side emission (FIG. 3). Based on the observed increase in side emission at each SR value, "low SR" is defined herein as about 0.3 to about 0.4 $\mu$m, "medium SR" is defined herein as about 0.4 to about 0.5 $\mu$m, and "high SR" is defined herein as greater than about 0.5 $\mu$m roughness for different subtractive engineered SEOFs to achieve variable (i.e., tunable) irradiance of side-emitted light. Overall, the side emission was found to rise at least 5× higher at any place along the fiber after solvent treatment.

While a uniform CYTOP® layer with a thickness of 15-$\mu$m was observed prior to solvent treatment, various dissolution times led to less polymer remaining on the fiber. The polymer layer was completely dissolved into the perfluorotributylamine after 5 hours of treatment.

Figure 4:
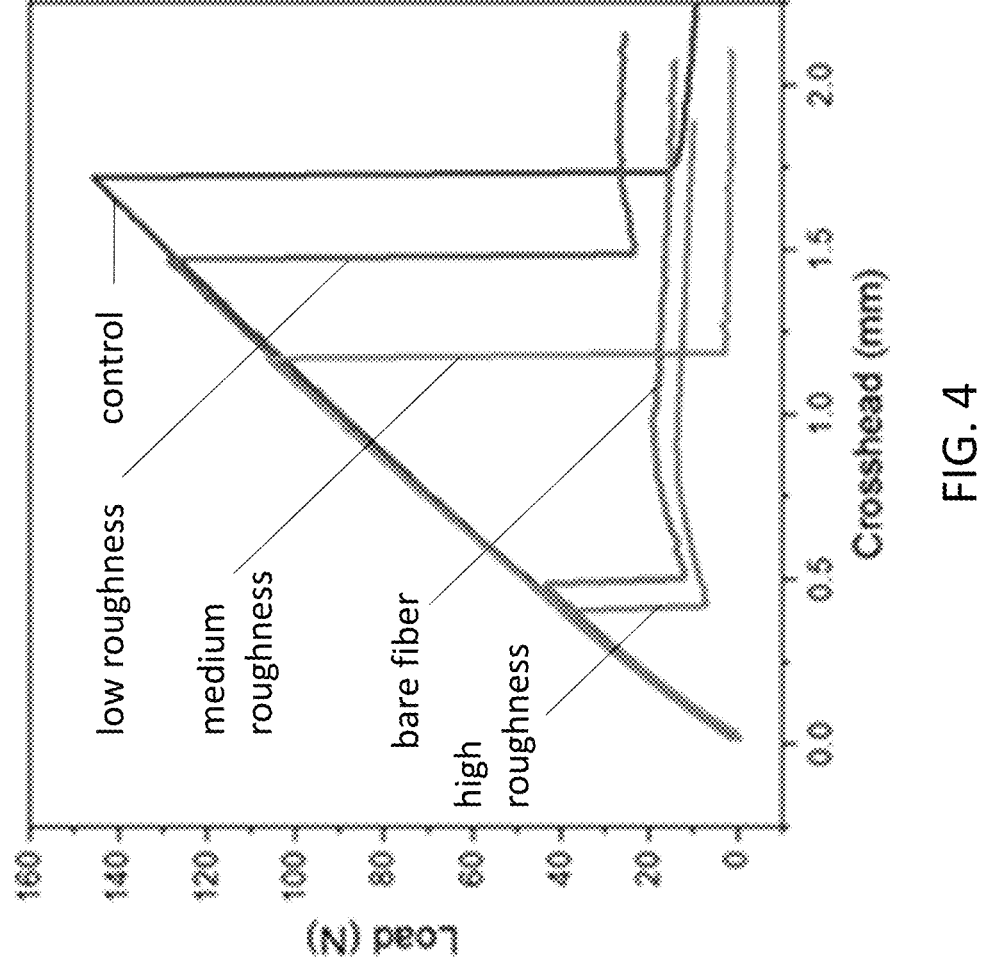
FIG. 4 shows the results of load testing on mechanical failure for a control optical fiber and optical fibers with low roughness, medium roughness, and high-roughness.

Based upon increased side-emitted light intensity, higher SR is desirable. However, modified SEOFs with higher SR were physically more brittle and less flexible. Tensile tests were performed for each fiber to determine the effect of surface roughness on the tensile strength. FIG. 4 shows the tensile load-elongation response of the fibers up to the failure load. The axial force to break the fiber by axial pulling on two ends of the fiber was used to compute the nominal tensile strength using a diameter of 500 $\mu$m. The as-received fiber with a uniform polymer coating had a tensile strength of 750 MPa. SEOFs with SR ranged from 0.35 $\mu$m to 0.5 $\mu$m showed a degradation in strength to 540 and 650 MPa, respectively. For the two most brittle samples, no statistically significant difference in tensile strength between high roughness and bare glass fiber without polymer was observed. In order to correlate the tensile strength to allowable compliance of a fiber subjected to bending in tubes, flexibility measurements were conducted by bending the fibers with SEOFs with varying SR values around a circular mandrel of various sizes in sequence. Higher bending capacity was observed by higher curvature. SEOFs with SR ranged from 0.35 $\mu$m to 0.5 $\mu$m met a mean curvature of 0.1-0.2 mm$^{-1}$ criterion, which is sufficiently compliant to be fitted into nearly all water systems. Further increasing the roughness decreases the flexibility, such that there was no statistical difference to the bare glass fiber's tolerance of diameter. Overall, introducing low or medium SR (SR<0.5 $\mu$m) onto a polymer cladded fiber increases the side emission and preserves flexibility. The flexibility (i.e., able to bend around a 1 cm radius curve) of the modified SEOF is suitable for many water applications (i.e., bends in domestic plumbing and inside of POU reactors).

Figure 6:
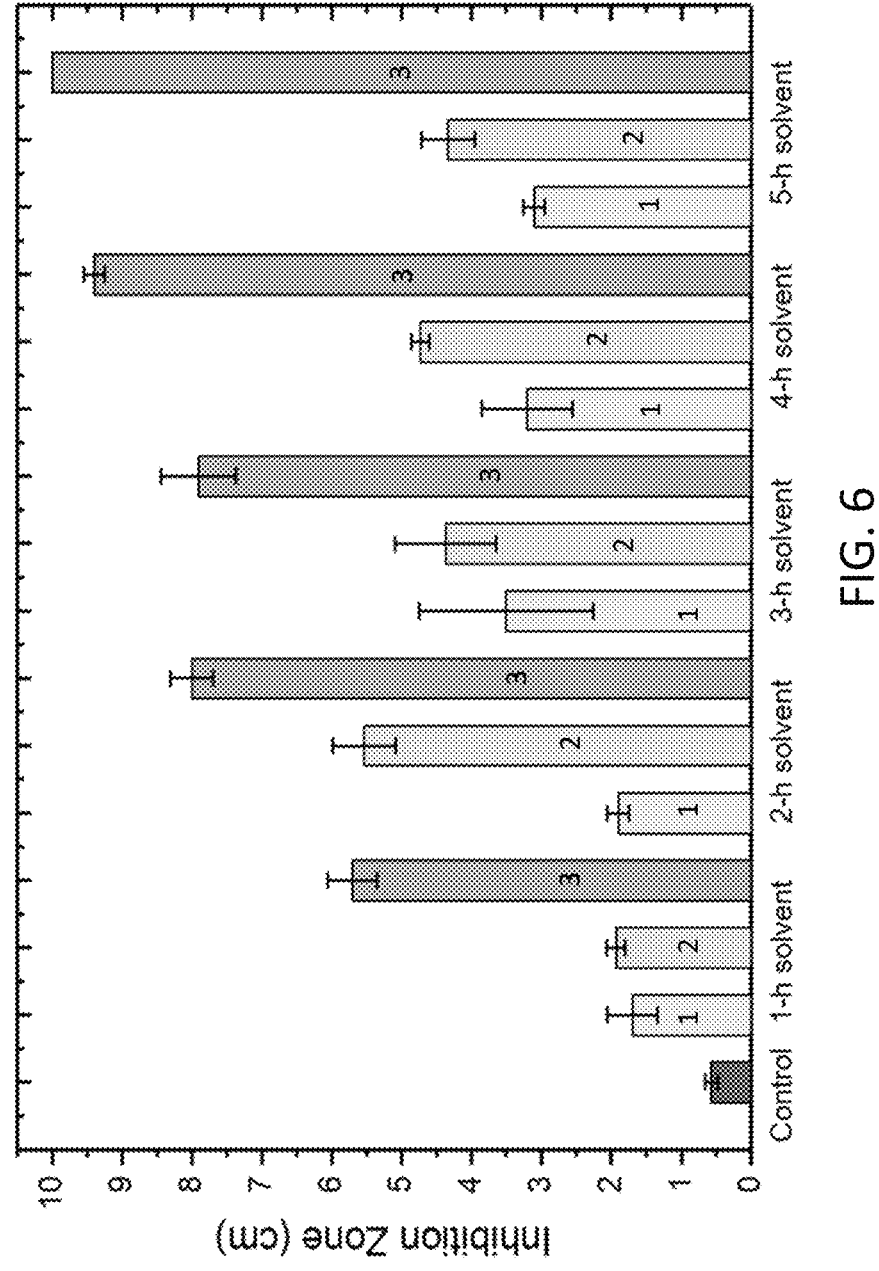
FIG. 6 shows the zone of inhibition of *P. aeruginosa* surrounding the control and modified SEOFs.

Biofilm formation was inhibited when bacteria suffered UV-C stress from SEOFs, resulting in an "inhibition zone" (see Example 6). SEOF without modification (control) placed 0.5 cm above biofilm on agar plates inoculated with *Pseudomonas aeruginosa* with overnight (12-hour) UV-C exposure resulted in a 0.5 cm width inhibition zone. The same experiment was performed using fibers with SEOFs with varying SR values (solvent treatment times). Two situations were compared: 1) the same UV-C exposure time with varying polymer subtractive (solvent treatment) time;

and 2) same polymer subtractive (solvent treatment) time with varying UV-C exposure. As shown in FIG. 6 the zones of inhibition of *P. aeruginosa* biofilm resulting from the tunable side emission from SEOF increased significantly relative to control.

To demonstrate that SR modified fibers are flexible enough to be used in narrow geometry water systems and perform superior to non-modified fibers in controlling biofilms, recirculating pipe-loop experiments were performed (see Example 7). Five parallel 1 meter long pipelines, each with two 180° curves (diameter of bend=10 cm) were mounted on a pegboard. SEOFs were inserted into each pipeline. The light intensity from SEOFs was measured as they were bent inside the tubing. Light measurements were taken through 3 cm holes located every 10 cm length along the pipelines, enabling the radiometer to access the interior of the tube. There was not more side-emitted light at the bends than along straight sections of the SEOF. There were two dark controls, one without SEOF and the other without LED. One reactor was equipped with an as-received coated optical fiber (SR=0.3 $\mu$m), which emitted >10 $\mu$W/cm$^2$ along the first 30 cm length and <3 $\mu$W/cm$^2$ between 30 to 100 cm. Then there were two duplicate systems, equipped SEOFs having medium-SR that provided >10× higher and significantly more uniform side emission than the as-received fiber; side-emitted light was 55±7.5 $\mu$W/cm$^2$ at the proximal end and 25±2.5 W/cm$^2$ at the terminal end. The distance between optical fiber and pipeline inner surface ranged from about 0 to about 0.5 cm.

Figure 7:
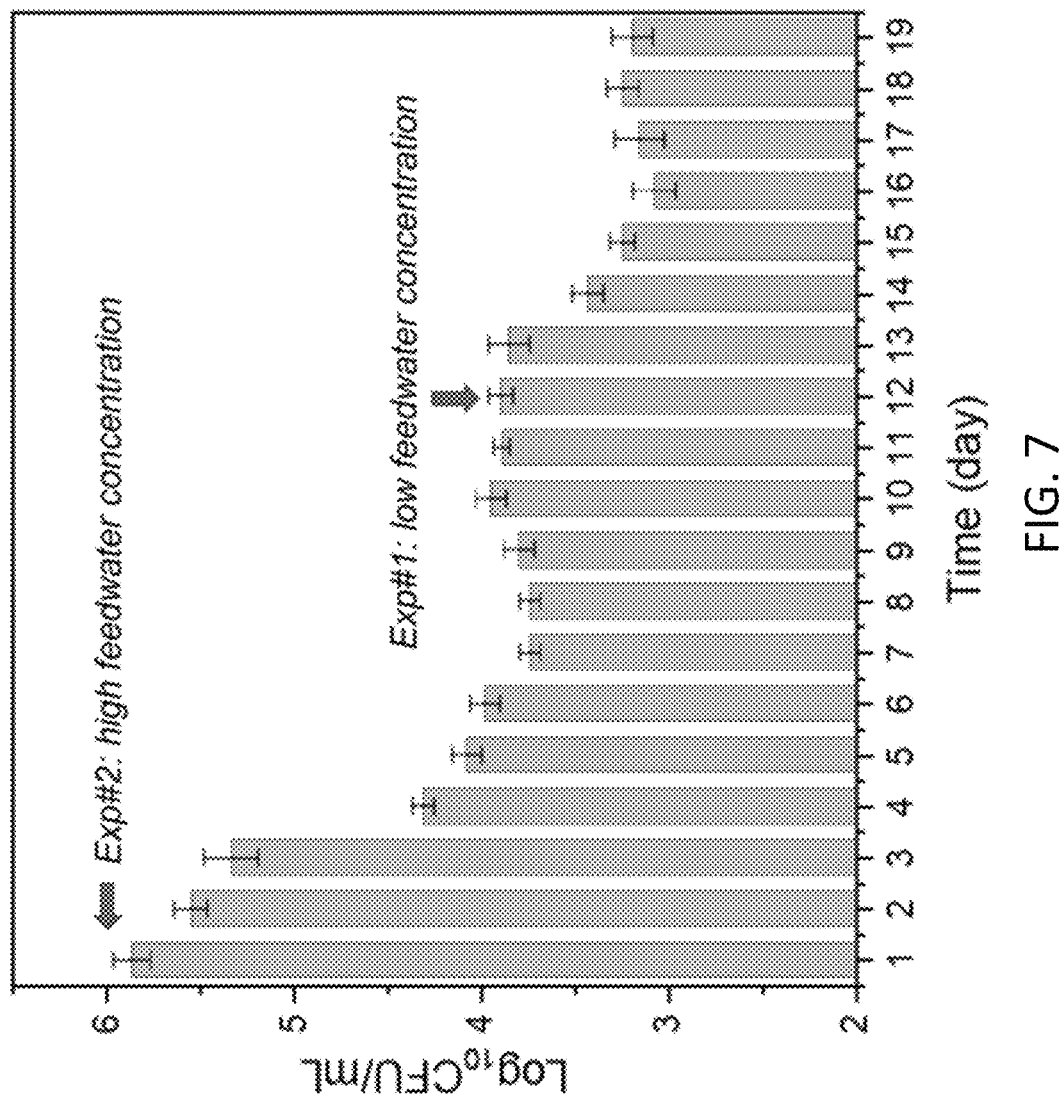
FIG. 7 shows feed water concentration on each day for a biofilm inhibition experiment in pipeline system.

Two separate experiments with initial feed water concentration of 10$^{3.9}$±0.07 CFU/mL and 10$^{5.9}$±0.1 CFU/mL were performed to grow biofilm at high and low bacterial density, respectively. The feed water *P. aeruginosa* concentration during the six days recirculation for these two experiments are shown in FIG. 7. Without UV-C exposure, a uniform ~800 CFU/cm$^2$ biofilm (10$^{2.9}$±0.12 CFU/cm$^2$) formed within the tubes of the dark controls. In the reactor equipped with non-SR modified fiber (SR-0.3-$\mu$m), biofilms were below the EPA recommended limit of 100 CFU/cm$^2$ for the first 20 cm of tubing, where the calculated wall irradiance was ~4.5 $\mu$W/cm$^2$. However, between 20 to 100 cm of tubing in this same reactor, 100-800 CFU/cm$^2$ was measured along the length. There was no statistical difference between biofilm formation at the terminal end of the reactor equipped with non-SR modified fiber and the dark controls. At all locations in both duplicate tubing systems with surface modified SEOF, the measured biofilm density was ~10 CFU/cm$^2$ (10$^{0.68}$±0.5 CFU/cm$^2$) and below the EPA recommended level. Overall, there was roughly 2-log lower live bacteria in biofilms when the calculated 275 nm irradiance at the wetted surface of the tube walls was >4.5 $\mu$W/cm$^2$.

Biofilm formation and growth or accumulation rates can be related to the planktonic bacterial levels in water flowing through piping systems. The UV-C inhibition rate is expected be larger than the biofilm growth rate to control microbial growth on surfaces. Therefore, a second set of pipe-loop tests using feed water containing a higher *P. aeruginosa* planktonic level (>10$^5$ CFU/mL during recirculation) was performed. The same as-received and surface modified fibers were used. Biofilm (10$^{4.3}$±0.1 CFU/cm$^2$) in the dark controls were higher using this feed water, which had a planktonic level of >105 CFU/mL. All three reactors with surface modified SEOFs had lower biofilm densities than the control reactors, and followed the same trends as observed with the lower *P. aeruginosa* planktonic levels. A greater than 1-log lower biofilm density was observed in any reactor when >4.5 $\mu$W/cm$^2$ was delivered to the wetted surface, but lower inhibition was observed for <4.5 $\mu$W/cm$^2$. However, the SEOFs did not inhibit biofilms to the same extent (i.e., <100 CFU/cm$^2$) as in experiments with the lower *P. aeruginosa* planktonic levels.

To integrate data from the two pipe-loop studies, the log-reduction in live biofilm density by UV-C (compared to non-irradiated controls) was combined across all experiments. The resulting trend indicated that delivering more than 10 to 20 $\mu$W/cm$^2$ from the SEOF to the tube wall led to a reduction of over 1-log in biofilm growth compared to the controls. This finding is particularly relevant in continuously recirculating systems, suggesting that higher UV-C irradiance levels may be necessary to maintain sufficient inactivation rates relative to the net growth rates of planktonic bacteria populations capable of continuous surface deposition.

EXAMPLES

Example 1. Fabrication and Surface Modification of SEOFs

Custom solarized quartz optical fibers with core diameter of 500-$\mu$m were manufactured at Molex (AZ, USA) with the following characteristics: 1.51 core refractive index, 0.39 Numerical Aperture. A smooth 15-$\mu$m thick CYTOP® polymer layer (BELLEX International Crop, Wilmington, DE) was coated on the fiber in a commercial optical fiber draw tower (Polymicro/Molex), which resulted in an outer fiber diameter of 528±0.63 $\mu$m. To adjust the surface roughness, 15 types of solvents were evaluated for their ability to gradually dissolve the CYTOP® layer and create a rough surface. Of these, perfluorotributylamine, a fluorinated organic solvent (ThermoFisher, A19126) was suitable. This solvent may be replaced by other perfluorinated chemicals (i.e., perfluoro-N-isopropylmorpholine, perfluoro 1,2-dimethyl cyclohexane, perfluorodecalin). SEOFs were dipped into the solvent for 0-5 hour with an interval of 30-min. A fiber cleaver (VytranFiber Cleaver, Thorlabs, NJ) was used to cut the fiber to 30 cm or 1 m lengths with a uniform and clean surface verified by an inspection microscope (FS201, 200×, Thorlabs, NJ). SEOFs were assembled into a SMA905 connecter and connected to an 80-mW UV-C LED driver (PearlLab Beam, AquiSense Technologies, Kentucky, U.S.A.) with a separation distance of 1 mm. The UV-C LED module contains a small fan and heat sink on the back of the LED to dissipate heat.

Example 2. Flexibility Measurement, Method A

Tensile tests were performed for the modified SEOFs to quantify the flexibility of SEOFs with varying surface roughness. 30 cm SEOFs with varying solvent treatment time were fixed into MTS 810 Load Frame and MTS Exceed 42.503 Load frame (MTS Headquarters, MN, USA). SEOFs were designed to fit any curved surfaces where light from UV lamps or LED chips is hard to reach. Tensile strength testing was performed under a constant straining rate through two grips on each side of the fiber. The required stress (Force, N) for pulling off the fiber, as well as the diameter (cm) for bending the fiber in circle until the fracture of the sample was collected and compared for different treatments. The force for pulling off until fracture is equal to the required stress for bending-breaks.

Example 3. Flexibility Measurement, Method B

Figure 5:
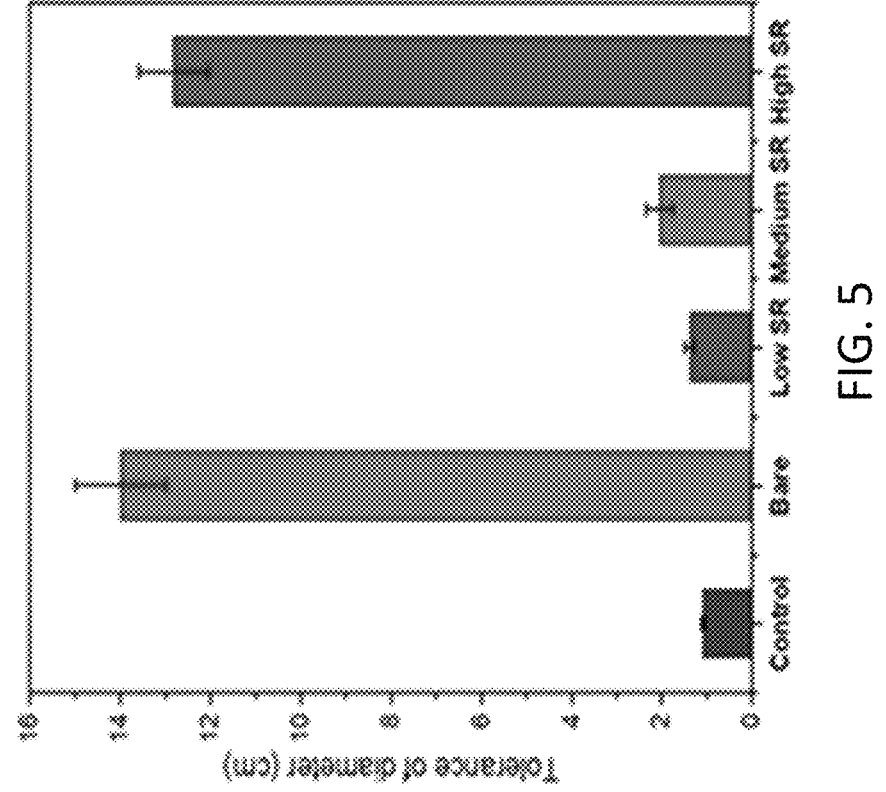
FIG. 5 shows the minimum tolerance of diameter by bending the fiber with low, medium, and high surface roughness.

Tensile tests were performed for the modified SEOFs to quantify the flexibility of SEOFs with varying surface roughness. 15 cm SEOFs with varying solvent treatment time were fixed into MTS 810 Load Frame and MTS Exceed 42.503 Load frame (MTS Headquarters, MN, USA). Tests were carried out under a constant straining rate through two grips on each side of the fiber. The required tensile strength (MPa) for pulling off the fiber, as well as the curvature (mm$^{-1}$) for bending the fiber in circle until the fracture of the sample was collected and compared for different treatments (FIG. 5). Higher bending capacity is evidenced by higher curvature.

Example 4. Light Measurement and Attenuation Model

Light irradiance ($\mu$W/cm$^2$) emitted from the LED, launched into a fiber, side-emitted from the surface of a SEOF or exiting the terminal end of the fiber was measured by an optical spectrophotoradiometer (AvaSpec-2048L, Avantes, CO). Measurements along the length of the fiber or distance perpendicular to the fiber surface were recorded. Measurements were performed on original manufactured fiber and fibers with differing decreases of surface roughness modifications. A UV-C dose at surface was calculated using Equation 1:

$$UV-C \text{ dose } (mJ/cm^2) = \text{Light intensity } (mW/cm^2) \times \text{Time (sec)} \quad (1)$$

The light intensity perpendicular away from the SEOF is the actual light intensity that irradiated the surface. Light attenuated in the air follows the Beer-Lambert law that shows an exponential decrease along the distance. The light intensity of each fiber at 0.5 cm, 1 cm, 1.5 cm, and 2 cm was measured by the radiometer. A mathematic model was created based on these measurements following Equation 2:

$$I \ (\mu W/cm^2) = I_0 e^{-kd} \quad (2)$$

where I ($\mu$W/cm$^2$) is the light intensity at the distance d (cm) perpendicular to the SEOF; $I_0$ ($\mu$W/cm$^2$) is the light intensity measured on the SEOF surface; k (cm$^{-1}$) is the attenuation coefficient. The cumulative power output (mW) side emitted along the SEOF was calculated using Equation 3:

$$\text{Power (mW)} = \pi DL \int_0^L I(x) \, dx \quad (3)$$

where L (cm) and D (cm) is the length and diameter of optical fiber, respectively.

Example 5. Surface Morphology Measurement

The cross-section of the SEOF with and without surface modification was imaged by scanning electron microscope (SEM) (FEI Philips XL-30, Eindhoven, The Netherlands). The change of CYTOP® layer was observed. Samples were mounted with graphite adhesive and coated with carbon before examined at 10 kV voltage. The surface roughness was further quantified by an optical profilometer (Zygo ZeScope). SEOFs treated by the solvent for 0-, 1-, 2-, 3-, 4-, and 5-hour were selected. A 50× objective combined with a 1.25× magnification changer was used for the optimum visualization of the fiber surface. At least three measurements were performed across the length of each fiber sample, resulting in 100-μm×50-μm 3D images for each measurement. The root mean square roughness ($R_{rms}$) of the surfaces was then reported to compare the surface roughness among samples. FIG. 2 shows the surface roughness of 500 μm optical fiber with varying duration of treatment time with perfluorotributylamine. Attenuated total reflection-Fourier transform infrared (ATR-FTIR) spectrometer (IFS 66v/S, Bruker Instruments, Billerica, MA, USA) was used to determine the change of functional groups associated with the CYTOP® layer before and after the surface roughness modification. The spectrometer was equipped with a diamond crystal under an angle of 45° and an average of 64 scans was collected for each scan during the measurement process.

Example 6. UV-C Exposure and Inhibition Zone Analysis

*Pseudomonas aeruginosa* (ATCC 15692) were first incubated in the LB broth (see Table 1) at 37° C. overnight. 1-mL suspension was then transferred into 25-mL new LB broth and incubate at 37° C. until the optical density reached 1 cm$^{-1}$, which represents a bacterial concentration of approximately 10$^9$ CFU/mL. This suspension was diluted 100× by phosphate-buffered saline PBS solution (see Table 1) to obtain a 10$^7$ CFU/mL culture before spread onto gridded square LB agar plates. The intent was to produce a thick layer of cells to represent a biofilm. A SEOF was placed in the middle of the petri dish and the distance between the SEOF and surface is approximately 0.5 cm. A SEOF was placed in the middle of the petri dish, and the distance between the SEOF and surface is approximately 0.5 cm. UV-C exposure for 1-hour, 2-hour, or 3-hour using surface modified SEOFs was applied immediately after the cell spreading.

After UV-C irradiation, the fibers were removed, and the plates were incubated at 37° C. for 12 hours. The distance between two boundary edges where biofilm do not grow centered around where the SEOF was placed, was termed the inhibition zone. The light irradiance at the edge was calculated using Equation 2 and correlated with the inhibition zone (cm) to determine the required UV-C dose for biofilm control on nutrient-rich agar surface. Additionally, three controls were performed: 1) inoculated agar surface without SEOF; 2) inoculated agar surface inserted with unmodified SEOF only without UV-C exposure; 3) inoculated agar surface inserted with unmodified SEOF with UV-C exposure overnight. Triplicates data were obtained using three different optical fibers on three different agar plates.

Example 7. Biofilm Inhibition Experiments in Water Using Flexible Plastic Tubing Reactors A feed water stock reactor (4 L) containing 0.1× M9 medium (see Table 1) was spiked with *P. aeruginosa*. Two separate experiments with initial feed water concentration of 10$^{3.9}$±0.07 CFU/mL and 10$^{5.9}$±0.1 CFU/mL were performed to grow biofilm at high and low bacterial density, respectively. The feed water *P. aeruginosa* concentration during the six days recirculation for these two experiments are shown in FIG. 7. The size of standard household POU plumbing (i.e., water heater, bathroom/kitchen sink) ranges from 0.5 cm to 1.9 cm; therefore, 1 cm tubing size was chosen. A single pump recirculated feed water continuously through 5 parallel tube reactors (1 cm diameter; 1 meter length; polypropylene). Polypropylene was selected because it is commonly used in household POU plumbing. A needle valve controlled flow through each tube reactor, which was set at 200 mL/min and could be monitored by an in-line flowmeter. Each 1-meter-long polypropylene tube reactor included two 180° bends to simulate potential realistic POU applications where a flexible SEOF may be more appropriate than a single point-source of light. SEOFs were inserted into tube reactors.

There were five parallel tube reactors: 1) one control without SEOF; 2) one control with a SEOF that was not irradiated (i.e., no LED); 3) one non-modified SEOF connected a LED to represent a lower-irradiation UV-C dose condition; 4) and 5) were identical replicates with two medium-roughness modified SEOF connected to a LED to represent a higher-irradiation UV-C dose condition. Experiments involved continuous flow of water through the tube reactors for 1 to 7 days. At the end of each experiment the 1 m tube pipe sections were removed from the quick-disconnects, cut using a sterilized razor into 10 equal length coupons (3 cm) every 10 cm apart. Each coupon was separately sonicated for 15 minutes to dislodge biofilm from the surface into the PBS solution. Dislodged bacteria were cultured and enumerated on LB agar plates, and the data used to calculate the biofilm density (CFU/cm$^2$) on the 3 cm section of tubing.

TABLE 1

| Characteristics of LB broth, M9 medium and PBS solution | |
| --- | --- |
| M9 medium | |
| Reagents | Concentration (mg/L) |
| NaCl | 468 |
| MgSO$_4$•7H$_2$O | 37 |
| NaHCO$_3$ | 42 |
| CaCl$_2$•2H$_2$O | 29 |
| KH$_2$PO$_4$ | 35 |
| NH$_4$Cl | 21 |
| Na$_3$C$_6$H$_5$O$_7$•2H$_2$O | 83 |
| Total | 808 |
| Glucose | 40 |
| pH | 7.4 |
| LB broth | |
| Reagents | Concentration (g/L) |
| NaCl | 10 |
| Tryptone | 10 |
| Yeast extract | 5 |
| pH | 7 |
| PBS solution | |
| Reagents | Concentration (g/L) |
| NaCl | 8 |
| KCl | 0.2 |
| Na$_2$HPO$_4$ | 1.44 |
| KH$_2$PO$_4$ | 0.24 |
| pH | 7.4 |

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A coated side-emitting optical fiber comprising:
a core comprising an optical fiber; and
a UV-C transparent polymer coating directly contacting the core and comprising a roughened surface formed by roughening, wherein an average surface roughness of the UV-C transparent polymer coating is in a range of about 0.35 µm to about 0.5 µm as measured by root mean square of distance difference measurements of the surface of the UV-C transparent polymer coating, and a thickness of the UV-C transparent polymer coating before roughening is in a range of about 5 µm to about 50 µm, and
wherein the coated side-emitting optical fiber, when inserted in a 1-meter-long pipeline with two 180° bends, each having a bend diameter of 10 cm, emits no more side-emitted light at the bends than along straight sections of the coated side-emitting optical fiber, based on light measurements taken through 3 cm holes located every 10 cm length along the pipeline.

2. The coated side-emitting optical fiber of claim 1, wherein the optical fiber comprises glass or quartz.

3. The coated side-emitting optical fiber of claim 1, wherein the optical fiber has a diameter in a range of about 125 µm to about 1500 µm.

4. The coated side-emitting optical fiber of claim 1, wherein the optical fiber has a refractive index in a range of about 1.4 to about 1.6.

5. The coated side-emitting optical fiber of claim 1, wherein the optical fiber has a numerical aperture in a range of about 0.1 to about 0.5.

6. The coated side-emitting optical fiber of claim 1, wherein the UV-C transparent polymer coating comprises a fluorinated polymer.

7. The coated side-emitting optical fiber of claim 1, wherein the UV-C transparent polymer coating comprises nanoparticles with a diameter in a range of about 100 nm to about 500 nm.

8. The coated side-emitting optical fiber of claim 7, wherein the nanoparticles comprise silicon, silica oxide, gold, silver, other metals, or other metal oxides.

9. The coated side-emitting optical fiber of claim 8, wherein the nanoparticles are functionalized with aminated organic compounds, carboxylated organic compounds, or neutral organic ligands.

10. A method of fabricating a modified side-emitting optical fiber, the comprising:
coating an optical fiber with a UV-C transparent polymer coating to yield a coated optical fiber, wherein a thickness of the UV-C transparent polymer coating is in a range of about 5 µm to about 50 µm;
contacting the coated optical fiber with a solvent; and
dissolving at least a portion of the UV-C transparent polymer coating in the solvent to yield a roughened UV-C transparent polymer coating on the optical fiber, wherein an average surface roughness of the roughened UV-C transparent polymer coating is in a range of about 0.35 µm to about 0.5 µm as measured by root mean square of distance difference measurements of the surface of the roughened UV-C transparent polymer coating,
wherein the optical fiber with the roughened UV-C transparent polymer coating, when inserted in a 1-meter-long pipeline with two 180° bends, each having a bend diameter of 10 cm, emits no more side-emitted light at the bends than along straight sections of the side-emitting optical fiber, based on light measurements taken through 3 cm holes located every 10 cm length along the pipeline.

11. The method of claim 10, wherein the solvent comprises an organic solvent.

12. The method of claim 11, wherein the organic solvent comprises a fluorinated organic solvent.

13. The method of claim 12, wherein the fluorinated organic solvent comprises perfluorotributylamine.

14. The coated side-emitting optical fiber of claim 1, wherein the UV-C transparent polymer coating is free of nanoparticles.

15. The coated side-emitting optical fiber of claim 1, wherein a tensile strength of the coated side-emitting optical fiber is in a range of 540 to 650 MPa.

16. The coated side-emitting optical fiber of claim 1, wherein side emission of the coated side-emitting optical fiber is at least 5 times higher at any place along the UV-C transparent polymer coating after roughening than at any place along the UV-C transparent polymer coating before roughening.

17. The method of claim 10, wherein side emission of the coated optical fiber with the roughened UV-C transparent polymer coating is at least 5 times higher at any place along the coated side-emitting optical fiber than at any place along the coated optical fiber before the dissolving.

18. The method of claim 10, wherein coating the optical fiber comprises providing the optical fiber to an optical fiber draw tower.

19. The method of claim 10, wherein contacting the coated optical fiber with the solvent occurs for a length of time between about 1 hour and about 3 hours.

20. The method of claim 10, wherein the UV-C transparent polymer coating is free of nanoparticles.

* * * * *